Oct. 12, 1943.   R. W. SHOEMAKER   2,331,430
APPARATUS FOR MAKING HOLLOW ARTICLES
Original Filed March 2, 1939   3 Sheets-Sheet 1
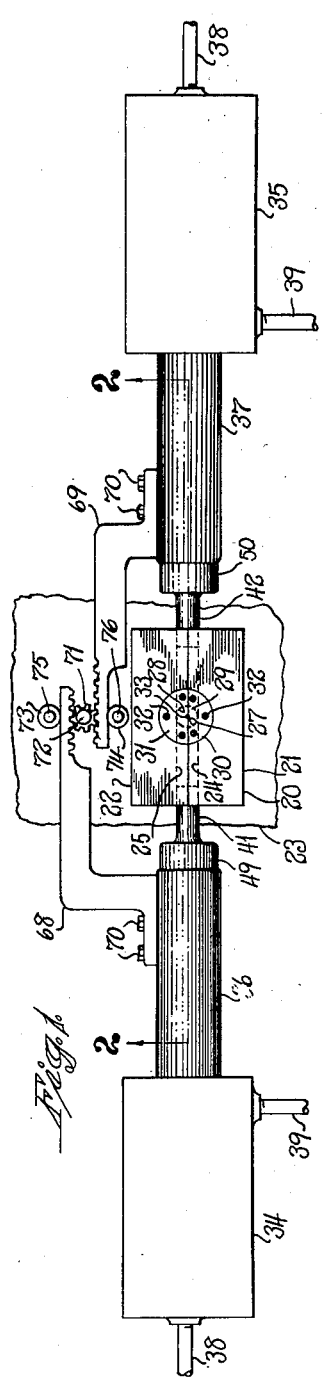
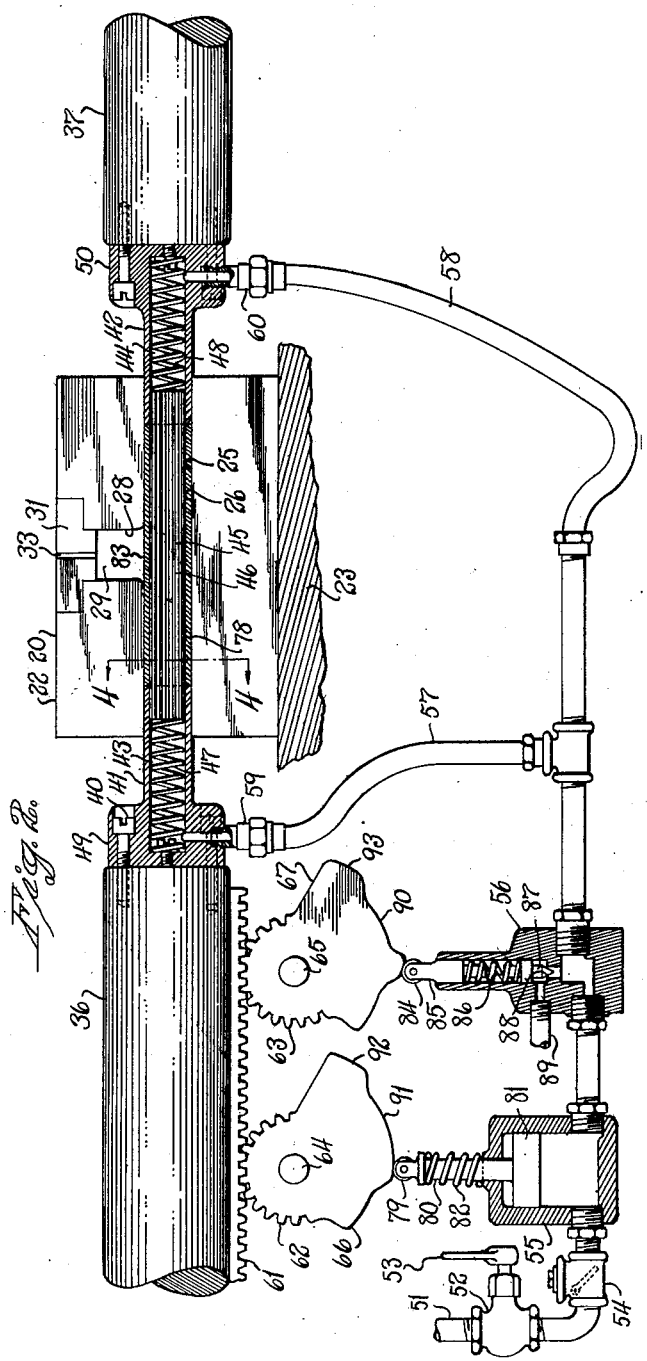
Inventor
Richard W. Shoemaker
by Seymour Earle Nichols
Attorneys Oct. 12, 1943.   R. W. SHOEMAKER   2,331,430
APPARATUS FOR MAKING HOLLOW ARTICLES
Original Filed March 2, 1939   3 Sheets-Sheet 2
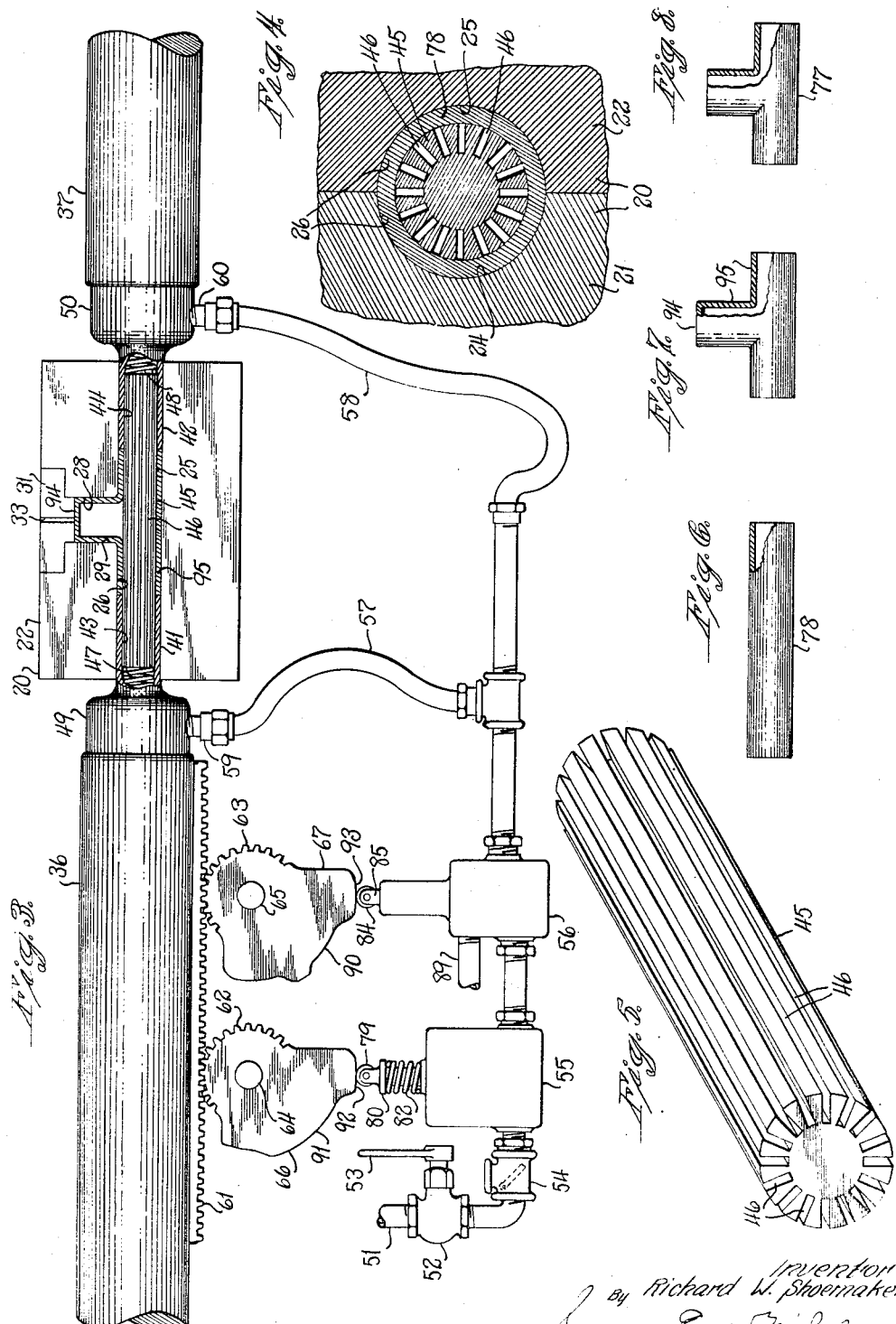
Inventor
By Richard W. Shoemaker
Seymour Earle Nichols
Attorneys

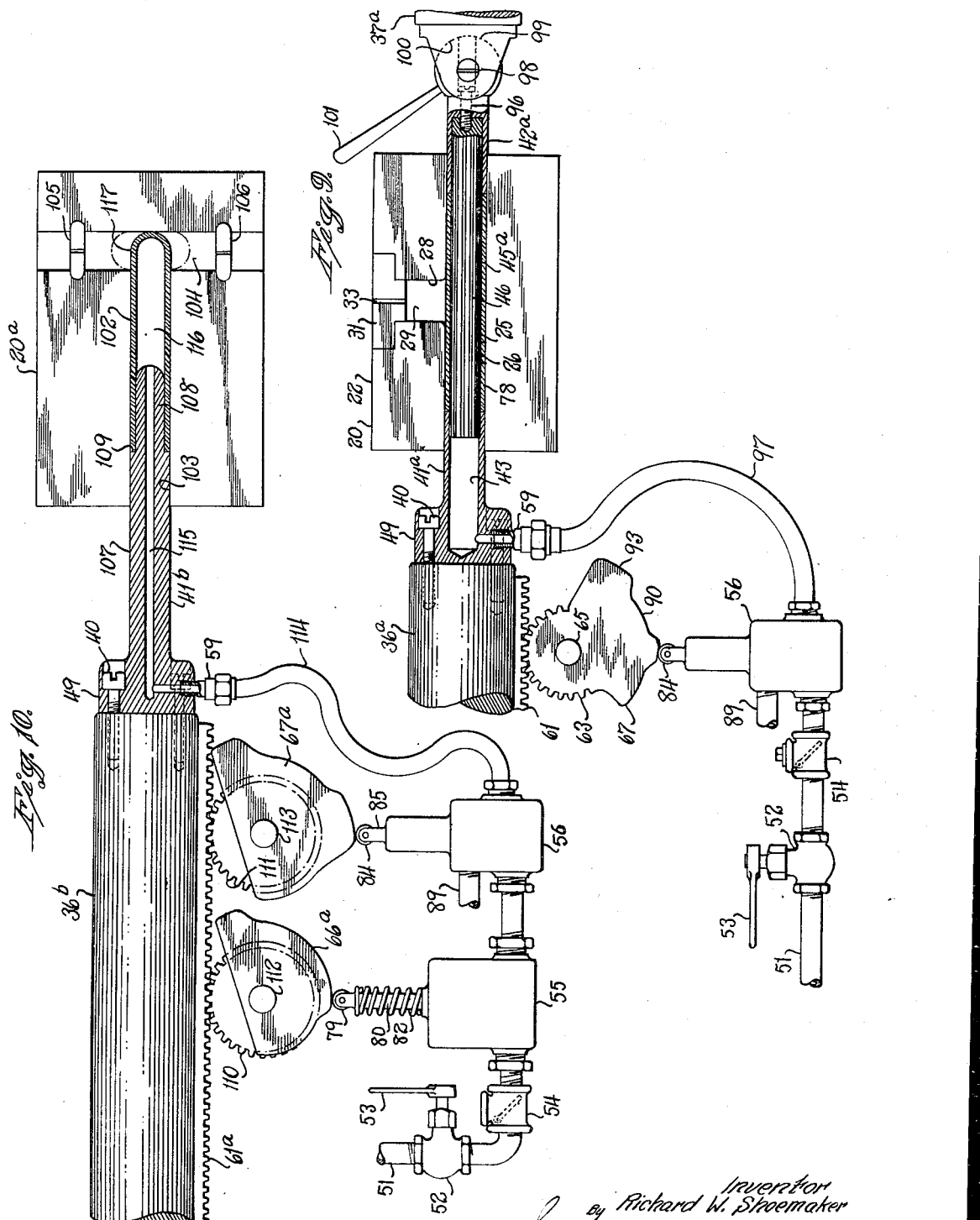

Patented Oct. 12, 1943

2,331,430

UNITED STATES PATENT OFFICE 2,331,430

APPARATUS FOR MAKING HOLLOW ARTICLES

Richard W. Shoemaker, Woodbury, Conn., assignor to Chase Brass & Copper Co. Incorporated, Waterbury, Conn., a corporation Continuation of applications Serial No. 259,426, March 2, 1939, and Serial No. 324,927, March 20, 1940. This application August 27, 1941, Serial No. 408,480

6 Claims. (Cl. 113—44)

This invention relates to improvements in apparatus for making expanded hollow articles. In the specific embodiment illustrated, the invention relates to making branch-fittings by expanding a hollow blank by means of fluid pressure.

This application is a continuation of my applications Serial No. 259,426, filed March 2, 1939, and Serial No. 324,927, filed March 20, 1940.

An object of this invention is to provide improved apparatus for making expanded hollow articles, with control-means for so controlling the fluid pressure as to avoid damaging or bursting the expanded portion of the hollow article.

Another object of this invention is to provide improved apparatus for making expanded hollow articles by means of fluid pressure and including a pair of opposed plungers slidable in opposite directions to have an upsetting action on a hollow blank to be expanded, and provided with synchronizing means interconnecting the plungers to compel them to simultaneously have the same amount of movement toward or from one another.

Another object of this invention is to provide improved apparatus for making expanded hollow articles, including a mandrel adapted to be inserted in the hollow blank that is to have a portion expanded, the mandrel being of a size to fit the blank and being provided with groove means to transmit fluid under pressure to the portion of the blank to be expanded.

With the above and other objects in view, as will appear to those skilled in the art from the present disclosure, this invention includes all features of the said disclosure which are novel over the prior art.

In the accompanying drawings forming part of the present disclosure, in which certain ways of carrying out the invention are shown for illustrative purposes:

Fig. 1 is a schematic top plan view illustrating one form of apparatus for carrying out the invention;

Fig. 2 is a fragmental vertical sectional view along the line 2—2 of Fig. 1 with certain parts omitted for clearness, the rams and plungers being shown at an intermediate position of their amplitude of travel, at the start of the expanding action on the blank;

Fig. 3 is a view similar to Fig. 2 but with the apparatus shown at the completion of the expanding operation;

Fig. 4 is a transverse fragmental sectional view taken on the line 4—4 of Fig. 2;

Fig. 5 is a perspective view of the mandrel;

Fig. 6 is a front elevation partly in section of a tubular blank prior to the expanding operation;

Fig. 7 is a similar view of the blank shown in Fig. 6 after it has been completely expanded;

Fig. 8 is a view similar to Fig. 7 with the closed end of the expanded portion cut off to form the third or branch opening of a T;

Fig. 9 is a view similar to Fig. 2 of a modified form of the invention; and

Fig. 10 is a view similar to Fig. 2 of a still further modified form of the invention.

In the description and claims, the various parts and steps are identified by specific names for convenience, but they are intended to be as generic in their application as the prior art will permit.

Referring to the particular form of the invention illustrated in Figs. 1 to 8 of the drawings, a die or matrix 20 including front and rear half-portions 21 and 22 are adapted to be detachably connected together in any suitable way and mounted upon the base or bed or frame of the machine 23. The die or matrix sections or portions 21 and 22 respectively have semicyclindrical die-grooves or recesses 24 and 25 (Fig. 4) which together form the cylindrical passage 26. The die sections or portions 21 and 22 also respectively have semicylindrical grooves 27 and 28 forming an expansion chamber 29 extending transversely from the die passage 26. The end of the expansion chamber 29 is closed by abutment means shown in the drawings as a pair of abutment blocks 30 and 31 respectively secured to the die portions 21 and 22 by screws 32, and having juxtaposed grooves in their adjacent faces to provide an air vent 33.

A pair of hydraulic cylinders 34 and 35 respectively have rams 36 and 37 which have sliding movement back and forth by means of fluid under pressure supplied to one or the other of the pipes 38, 39 on each cylinder and controlled by suitable valves (not shown) of usual form whereby the rams move back and forth under the control of an operator.

The rams 36 and 37 respectively have secured to their outer ends by means of screws 40, hollow plungers 41 and 42 respectively having interior cylindrical passages 43 and 44. The cylindrical outside surface of the plungers 41 and 42 have a close sliding fit in the cylindrical passage 26 of the die 20, and the inside cylindrical passages 43 and 44 of the hollow plungers are of a size to slidingly receive a mandrel 45 which has a plurality of grooves 46 extending longitudinally throughout its length and arranged about its cylindrical surface to facilitate the quick free travel of the pressure liquid lengthwise of the mandrel to the part of the blank to be expanded, regardless of the rotational and longitudinal position of the mandrel, and to aid in the pressure liquid lubricating the sliding of the blank portions along the mandrel while the mandrel supports the blank against collapsing when the blank is being upset endwise, as later more fully described. Springs 47 and 48 are respectively housed in the hollow plungers 41, 42 and are secured to the outer ends or heads 49 and 50 of the said hollow plungers, the inner ends of the springs 47 and 48 pressing against opposite ends of the mandrel 45 and serving to position the mandrel centrally of the blank.

Fluid in the form of liquid is adapted to be supplied from a source of supply (not shown) through a pipe 51 to a faucet or control valve 52 adapted to be opened or closed by a handle 53, the fluid then passing through a high-pressure check valve 54 and then through a pressure producing device or cylinder 55, then through a relief valve 56, then through flexible tubes 57 and 58 to connections 59 and 60 which are respectively connected to the cylindrical passages 43 and 44 of the hollow plungers 41 and 42.

The ram 36 carries a rack 61 the teeth of which mesh with the teeth of sector gears 62 and 63 respectively pivoted by means of shafts 64 and 65. The sector gears 62 and 63 respectively have cams 66 and 67 thereon.

The rams 36 and 37 respectively have L-shaped racks 68 and 69 secured to the rams by bolts 70, the racks having rack teeth meshing with the teeth of a spur gear 71 pivotally mounted at 72 on the base 23 of the machne, the racks being held in engagement with the gear 71 by backing rollers 73 and 74 pivotally mounted respectively at 75 and 76 on the base 23 of the machine. The racks 68 and 69 and gear 71 constitute synchronizing means which interconnect the rams 36 and 37 and compel them and the plungers 41 and 42 to simultaneously have the same amount of movement toward and from one another.

When it is desired to wake an expanded hollow article, as for example a T such as 77 shown in Fig. 8, the rams 36 and 37 are caused to be moved further apart than is shown in Fig. 2, and one or both of the die portions 21, 22 of the die 20 are moved to separate them to permit of the transverse introduction of a tubular blank 78 and the mandrel 45 into position as shown in Fig. 2, with the mandrel 45 fitting in the interior of, and extending through the tubular blank 78 beyond each end thereof. After the die sections 21 and 22 have been closed together by any suitable means (not shown) and locked thus, the control mechanism (not shown) is actuated to cause the rams 36 and 37 to move inwardly toward one another to bring inner ends of the hollow plungers 41 and 42 into engagement with the ends of the tubular blank 78, and bring the springs 47 and 48 into engagement with the opposite ends of the mandrel 45 to centralize the latter. By means of the handle 53, fluid under pressure, which pressure may be small such, for example, as fifty pounds per square inch, is introduced from the pipe 51 into the system to fill the pressure cylinder 55, relief valve 56, the interior of the hollow plungers 41 and 42, blank 78 and the grooves 46 of the mandrel 45, after which the control handle 53 can be turned to shut off the valve 52.

Upon proper actuation of the control mechanism (not shown), the rams 36 and 37 are caused to travel further toward one another thus causing the rack 61 and sector gear 62 to swing the cam 66 to a position to force the roller 79 and the plunger 80 to which it is pivoted, and the piston 81 carried by the lower end of the plunger 80, downwardly against the action of the spring 82 to thus raise the fluid pressure in the system to a pressure which is sufficiently high to start the expansion of the central lateral portion 83 of the blank 78 facing the expansion chamber 29 of the die 20.

At the same time that this expanding action starts to take place, the rack 61 has swung the sector gear 63 to bring a portion of the cam 67 against the roller 84 pivoted on the plunger 85 to force the plunger downwardly against the spring 86 and cause the latter to hold the valve member 87 against the valve seat 88 with sufficient force to ensure that the pressure is raised to an adequately high amount to initiate the expansion of the portion 83 of the blank 78. If the piston 81 of the pressure cylinder 55 tends to raise the pressure too high, then the valve member 87 is raised off of its seat 88, permitting fluid to escape out through the escape pipe 89 of the relief valve 56. Meanwhile the rams 36 and 37 have been traveling still further toward one another and compressing the ends of the blank 78 toward one another thus feeding metal toward the location 83 of the blank 78 which is being bulged or expanded out into the expansion chamber 29.

As the portion 83 of the blank starts to expand, it quickly arrives at a point where it requires less fluid pressure to cause further expansion than was necessary to start the initial expansion, and therefore the cam 67 has a portion 90 which permits roller 84 and plunger 85 to rise and thus reduce the pressure of the plunger 85 on the spring 86, thus permitting the valve member 87 to open at a lower pressure to thus avoid risk of undue pressure damaging or bursting the portion 83 of the blank by too quick or violent expansion thereof. Meanwhile the cam portion 91 of the cam 66 has been gradually pressing the roller 79, plunger 80 and piston 81 down further to maintain the pressure in the system against loss of pressure by leakage. The pressure in excess of that required for the continued expansion of the portion 83 of the flank 78 being relieved by the relief valve 56, as previously described, the excess fluid passing outwardly through the escape-pipe 89. Thus it will be seen that once the operator starts the rams traveling toward one another, the fluid pressure within the blank at any given instant is regulated by mechanical connections with one of the rams, so that predetermined fluid pressures are provided at predetermined positions of the travel of the ram, and without any further action by the operator, to provide various predetermined needed fluid pressures at various stages of the expansion of the blank.

Finally, when the rams 36 and 37 arrive at the positions shown in Fig. 3, the cam projections 92 and 93 respectively of the cams 66 and 67 result in a higher pressure in the system to thus force the end 94 of the blank out sharply into the angular portions of the expansion chamber 29 to thus form the expanded or completed blank 95 (Figs. 3 and 7).

Upon causing the rams 36 and 37 to move away from one another, the fluid pressure within the completed blank 95 rapidly falls toward zero, and when the rams have moved to their original position (somewhat further apart than shown in Fig. 2) to bring the ends of the hollow plungers 41 and 42 out beyond the ends of the mandrel 45, the die portions 21 and 22 are opened up or separated to permit removal of the completed blank 95 (Figs. 3 and 7) with the mandrel 45. The mandrel 45 is then removed from the completed blank 95 and inserted in another blank 78 and inserted in the die sections 21 and 22, whereupon the previously-described procedure is repeated to make another completed blank 95.

The end 94 is cut or otherwise removed from the partly-finished blank 95 to produce the finished T 77 shown in Fig. 8.

In the form of the invention illustrated in Fig. 9, the rams 36a and 37a respectively have secured thereto, slightly-modified forms of hollow plungers 41a and 42a, the hollow plunger 42a having a modified form of mandrel 45a secured thereto by a screw 96. The die 20 is formed of two parts 21, 22 similar to the construction shown in Figs. 1 and 2. Fluid under pressure can be brought from a suitable source as, for example, from a hydraulic pump or accumulator, through a pipe 51 to a control-valve 52 controlled by a handle 53, the fluid under pressure passing from the valve 52 through a check valve 54 and then to a relief valve 56, to which is secured a flexible tube 97, the other end of which is connected to the hollow plunger 41a.

The rack 61 on the ram 36a actuates the sector gear 63 having the cam 67 thereon which actuates the roller 84 of the spring-pressed plunger 85 in similar fashion to that previously described in more detail concerning Fig. 2.

The mandrel 45a is longer than the mandrel 45 used in the Fig. 2 form of the invention, and in order to avoid the need of moving the rams 36a and 37a further apart, the hollow plunger 42a can be pivoted to the ram 37a by a screw 98, and has a rear cylindrical face 99 adapted to thrust against a corresponding cylindrical face 100 of the ram 37a. An operating-handle 101 provides for swinging the plunger 42a and mandrel 45a up away from between the die sections 21, 22 in order to remove a completed blank and replace a new cylindrical blank thereon for another operation, after which the mandrel with the new blank is swung down to horizontal position. The die sections 21, 22 are then closed and the expanding operation is repeated.

During the expanding operation, the pressures are controlled by the cam 67 acting on the relief valve 56 in a manner similar to that described concerning Fig. 2. Instead of a fluid medium being received under high pressure through the pipe 51, this fluid pressure may be merely a filling pressure similar to that described concerning Fig. 2, and the high pressure may be obtained by the pressure build up due to the rams 36a and 37a moving inward and compressing the fluid within the blank and the hollow plungers 41a.

In the form of the invention illustrated in Fig. 10, the blank to be expanded is in the form of a cup or test tube 102, instead of being in the form of the tube 78 open at both ends. The die 20a that is to be used is formed of two parts in a similar manner to the two-part die 20 illustrated in the previous forms of the invention. The main die passage 103 of the die 20a is at right angles to and intersects a transverse passage 104 which extends entirely across the die 20a and has abutments 105, 106 inserted therein.

A ram 36b is constructed to have a greater amplitude of back-and-forth movement than any of the rams previously described, in order to provide the necessary longer working movement needed to form the blank 102 into a T, and has secured to its end a hollow plunger 41b having a main portion 107 slidingly fitting in the passage 103 and having a reduced portion 108 adapted to slidingly fit within the blank 102, the annular shoulder 109 being adapted to abut against the open end of the blank 102.

Owing to the greater amplitude of travel of the ram 36b, and the consequent greater angle of rotation of the actuating cams 66a and 67a, it is necessary to have these cams displaced transversely away from the location of the rack 61a, and therefore gears 110 and 111 respectively secured to shafts 112 and 113 are located beneath and mesh with and are actuated by the rack 61a, while the cams 66a and 67a, respectively secured on the shafts 112 and 113 at one side of the gears 110 and 111, serve for actuating the fluid pressure device 55 and relief valve 56 in a manner similar to that described concerning the construction shown in Figs. 1 and 2, although the cams 66a and 67a have a greater angle of rotation than is true of the cams 66 and 67 in Fig. 2.

The fluid to provide the fluid pressure to expand the blank 102 is brought in through the supply pipe 51, through control valve 52 provided with control handle 53, through check valve 54, through the pressure device 55, through the relief valve 56, and then through the flexible tube 114 to the longitudinal opening 115 in the hollow plunger 41b, from whence it enters into the interior 116 of the blank 102.

After the system has been filled with fluid from the supply pipe 51 and the handle 53 has been shut off, the ram 36b is caused to move to the right which causes the cams 66a and 67a to respectively actuate the mechanism of the pressure device 55 and relief valve 56 so that after the expansion of the inner end 117 of the blank 102 starts, the pressure is lowered by means of the cam 67a, permitting the relief valve 56 to open at a lower pressure, and after the end 117 has expanded to near its full position in opposite directions toward the abutments 105 and 106, then the last portion of the cam 67a to act, insures that the relief valve 56 shall only open at relatively-high pressure, and the corresponding portion of cam 66a produces a higher pressure in the pressure device 55 to thus cause the opposite end portions of the blank 102 to be pressed tightly and sharply against the abutments 105 and 106 in an analogous manner to that concerning the portion 94 described concerning Fig. 3. In the mode of operation just described concerning Fig. 10, after the expanded blank 102 is removed from die 20a, the two closed end portions of the blank that will be formed adjacent the abutments 105 and 106 are then cut off to produce a T similar to the T 77 shown in Fig. 8.

It will be seen that in all the forms of the invention, the pressure is changed during the upsetting or end-pushing action on a blank which is being expanded. And it will also be seen that each time the operator starts the mechanism in action to move the mandrel or mandrels in a direction to upset any one of a number of successive similar blanks, that the same pressures will be repeatedly produced at the same positions or distances of travel of the plunger or plungers as occurred in the action on a previously-expanded blank. Thus, by the operator successively inserting new blanks into the mechanism and successively starting the mechanism to expand the blanks, the same pressures will automatically be reproduced at the same locations or stages of production of the successive blanks.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. Apparatus for making an expanded hollow article comprising: a die having a blank-receiving passage and an expansion chamber leading therefrom; plunger means slidable in said passage and adapted to upset a hollow blank in said passage; means adapted to apply fluid under pressure to the interior of said hollow blank to expand a portion of the blank into said expansion chamber; and means connected with and actuated by said plunger means and constructed and arranged to vary the pressure of said fluid in said hollow blank in a predetermined way dependent upon the travel of said plunger means, said variation of fluid pressure including a first relatively-high pressure and a later relatively-low pressure.

2. Apparatus for making an expanded hollow article comprising: a die having a blank-receiving passage and an expansion chamber leading therefrom; plunger means slidable in said passage and adapted to upset a hollow blank in said passage; means adapted to apply fluid under pressure to the interior of said hollow blank to expand a portion of the blank into said expansion chamber; and means connected with and actuated by said plunger means and constructed and arranged to vary the pressure of said fluid in said hollow blank in a predetermined way dependent upon the travel of said plunger means, said variation of fluid pressure including a first relatively-high pressure, a later relatively-low pressure and a still later relatively-high pressure.

3. Apparatus for making an expanded hollow article comprising: a die having a blank-receiving passage and an expansion chamber leading therefrom; plunger means slidable in said passage and adapted to upset a hollow blank in said passage; means adapted to apply fluid under pressure to the interior of said hollow blank to expand a portion of the blank into said expansion chamber; a mandrel adapted to be placed in the hollow blank and having a plurality of exterior longitudinally-extending grooves so spaced-apart around the mandrel that in any rotational position of the mandrel, at least one of said grooves is adapted to transmit the fluid under pressure directly against the portion of the blank to be expanded; and means for controllably varying the pressure of said fluid at successive stages of said expanding action.

4. Apparatus for making an expanded hollow article comprising: a die having a blank-receiving passage therethrough and an expansion chamber leading from said passage; plunger means comprising a pair of plungers slidable in opposite ends of said passage and adapted to subject opposite ends of a hollow blank in said passage to upsetting action; synchronizing means interconnecting said plungers to compel them to simultaneously have the same amount of movement toward one another; means adapted to apply fluid under pressure to the interior of said hollow blank to expand a portion of the blank into said expansion chamber; and means connected with and actuated by said plunger means and constructed and arranged to vary the pressure of said fluid in said hollow blank in a predetermined way dependent upon the travel of said plunger means, said variation of fluid pressure including a first relatively-high pressure and a later relatively-low pressure.

5. Apparatus for making an expanded hollow article comprising: a die having a blank-receiving passage therethrough and an expansion chamber leading from said passage; plunger means comprising a pair of fluid-actuated plungers slidable in opposite ends of said passage and adapted to subject opposite ends of a hollow blank in said passage to upsetting action; synchronizing means interconnecting said plungers to compel them to simultaneously have the same amount of movement toward one another; means adapted to apply fluid under pressure to the interior of said hollow blank to expand a portion of the blank into said expansion chamber; and means connected with and actuated by said plunger means and constructed and arranged to vary the pressure of said fluid in said hollow blank in a predetermined way dependent upon the travel of said plunger means, said variation of fluid pressure including a first relatively-high pressure and a later relatively-low pressure.

6. Apparatus for making expanded hollow articles comprising: a die having a blank-receiving passage and an expansion-chamber leading therefrom; plunger-means slidable in said passage and adapted to upset a hollow blank in said passage; means to apply fluid under pressure to the interior of said hollow blank to expand a portion of the blank into said expansion-chamber; and a mandrel adapted to be placed in the hollow blank and having its exterior provided with a plurality of longitudinally-extending grooves so spaced around the mandrel that in any rotational position of the mandrel, at least one of said grooves is adapted to transmit the fluid under pressure directly against the portion of the blank to be expanded.

RICHARD W. SHOEMAKER.